(12) United States Patent
Smith et al.

(10) Patent No.: US 7,291,953 B1
(45) Date of Patent: Nov. 6, 2007

(54) HIGH PERFORMANCE MOTOR AND MAGNET ASSEMBLY THEREFOR

(75) Inventors: James F. Smith, Smithtown, NY (US); Nandakumar Thirunarayan, Saint James, NY (US)

(73) Assignee: Anorad Corporation, Shirley, NY (US)

( * ) Notice: Subject to any disclaimer, the term of this patent is extended or adjusted under 35 U.S.C. 154(b) by 0 days.

(21) Appl. No.: 11/381,648

(22) Filed: May 4, 2006

Related U.S. Application Data (60) Continuation-in-part of application No. 11/151,152, filed on Jun. 13, 2005, which is a division of application No. 10/889,384, filed on Jul. 12, 2004, now Pat. No. 6,919,653, which is a division of application No. 10/369,161, filed on Feb. 19, 2003, now Pat. No. 6,803,682.

(60) Provisional application No. 60/358,654, filed on Feb. 21, 2002.

(51) Int. Cl.
 *H20K 7/20* (2006.01)
(52) U.S. Cl. .......... 310/112; 310/191; 310/74; 310/113; 310/117; 310/121
(58) Field of Classification Search .......... 310/191, 310/112, 74, 113, 117, 121
See application file for complete search history.

(56) References Cited

U.S. PATENT DOCUMENTS

| | | | |
|---|---|---|---|
| 6,016,021 A | 1/2000 | Hinds | |
| 6,097,114 A | 8/2000 | Hazelton | |
| 6,380,661 B1 | 4/2002 | Henderson et al. | |
| 6,455,957 B1 | 9/2002 | Chitayat | |
| 6,608,408 B1 * | 8/2003 | Denne | 310/14 |
| 6,657,344 B2 * | 12/2003 | Post | 310/90.5 |
| 6,717,296 B2 * | 4/2004 | Hol et al. | 310/12 |
| 6,794,777 B1 * | 9/2004 | Fradella | 310/74 |
| 6,841,910 B2 * | 1/2005 | Gery | 310/103 |
| 6,846,168 B2 * | 1/2005 | Davis et al. | 417/423.7 |
| 6,858,962 B2 * | 2/2005 | Post | 310/191 |
| 7,078,838 B2 * | 7/2006 | Post | 310/90.5 |

FOREIGN PATENT DOCUMENTS

| | | |
|---|---|---|
| JP | 2001197717 A | 7/2001 |
| JP | 2001145328 A | 5/2002 |

OTHER PUBLICATIONS

James R. Hendershot, et al. "Design of Brushless Permanent-Magnet Motors", Dec. 1994, vol. 37, Oxford University Press.

* cited by examiner

*Primary Examiner*—Darren Schuberg
*Assistant Examiner*—Iraj A. Mohandesi
(74) *Attorney, Agent, or Firm*—Amin Turocy & Calvin LLP; Alexander R. Kuszewski (57) ABSTRACT

A magnet assembly includes a back iron and an array of magnets. The back iron is in the form of a plate having opposed surfaces. The magnets are arranged along one of the surfaces, with the other surface being dimensioned and configured according to the magnetic field distribution associated with the magnets. The back iron geometry provides for reduced mass, reduced leakage flux, and high flux densities to improve performance of a linear motor that employs such a magnet assembly. Additionally, the back iron can be a magnetically conductive annular ring, such as is employed in a rotary motor. Moreover, the magnets can be arranged in a manner that generates a Halbach array to increase force output in a desired direction while canceling stray magnetic fields in other directions. Similar reduced-mass designs can be employed in conjunction with a back iron of a fixed cross-section and magnets of variable thicknesses, variable lengths, and/or variable widths. In a case where the arrangement is employed in a platen and forcer system, plates on both the platen and forcer may be scalloped to reduce mass.

17 Claims, 9 Drawing Sheets

HIGH PERFORMANCE MOTOR AND MAGNET ASSEMBLY THEREFOR

REFERENCE TO RELATED APPLICATIONS

This application is a continuation-in-part of U.S. patent application Ser. No. 11/151,152, filed Jun. 13, 2005, entitled HIGH PERFORMANCE LINEAR MOTOR AND MAGNET ASSEMBLY THEREFOR, which is a divisional application of U.S. patent application Ser. No. 10/889,384, filed Jul. 12, 2004 now U.S. Pat. No. 6,919,653, entitled HIGH PERFORMANCE LINEAR MOTOR AND MAGNET ASSEMBLY THEREFOR, which is a divisional application of U.S. patent application Ser. No. 10/369,161, filed Feb. 19, 2003 now U.S. Pat. No. 6,803,682, entitled HIGH PERFORMANCE LINEAR MOTOR AND MAGNET ASSEMBLY THEREFOR which claims the benefit of U.S. Provisional Patent Application Ser. No. 60/358,654, filed on Feb. 21, 2002, and entitled HIGH PERFORMANCE LINEAR MOTOR MAGNET ASSEMBLY THEREFOR. The entireties of these applications are incorporated by reference herein.

TECHNICAL FIELD

The present invention relates to motors and, more particularly, to a magnet assembly and to a motor incorporating the magnet assembly.

BACKGROUND OF THE INVENTION

Linear motors are used in various types of systems, such as for positioning and moving applications, including machining and gantry type systems. The high performance systems often require moving elements subjected to high acceleration levels. In order to achieve such high acceleration, the linear motor must exert large forces upon the elements to be moved.

There are various configurations of linear motors, including flat motors, U-channel motors and tubular shaped motors. Different types of linear motors are also available, including brush, AC brushless, stepper, and induction motors. Common to most linear motors is a moving assembly, usually called a forcer or stage, which moves relative to a stationary platen (or path) according to magnetic fields generated by application of current through one or more associated windings. The windings can be on the forcer or at the platen depending on the type of motor. For example, in a permanent magnet linear motor, a series of armature windings can be mounted within a forcer that is movable relative to a stationary path. The path can include an array of permanent magnets configured to interact with the coils in the stage when energized with an excitation current.

Alternatively, in another type of conventional linear motor, permanent magnets can be part of a moveable stage with the coils situated in the platen. Usually, the permanent magnets are attached to a back iron plate above the coils, which are oriented along a path of travel. The magnets usually are rectangular in shape. The magnets are arranged along the back iron so that adjacent pairs of magnets have opposite magnetic pole orientations. The magnets can be oriented generally normal to the direction of travel or inclined at a slight angle from normal to an axis of the direction of travel for the linear motor. The inclined angle creates a flux distribution along the axis of movement, which is generally sinusoidal in nature. Such a resulting distribution due to the optimized motor geometry tends to reduce cogging during operation of the linear motor, which would otherwise occur if the magnets were aligned, normal to the axis of movement.

Although an inclined angle of the magnets can reduce some cogging, it presents a disadvantage in that a larger area typically must be covered by the rectangular magnets in order to sufficiently cover and interact with the coils of the armature. When the magnets are implemented with a larger area so as to reduce cogging effects, a larger footprint for the back iron also is required. This tends to increase the overall weight and size of the stage. Such increases in size and weight can present additional obstacles, such as in applications where there are size constraints and low mass is desirable. For example, as the mass of the stage increases, the available acceleration experiences a corresponding reduction, and the ability to stop the motor accurately also reduces because of the increased power dissipation needed to stop the motor.

As the use of linear motors in manufacturing equipment continues to increase, nominal increases in the speed of operation translate into significant savings in the cost of production. Accordingly, it is desirable to provide a magnet assembly that can be part of a high performance linear motor.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides a magnet assembly that can be employed as part of a linear motor stage to form a high performance linear motor. The magnet assembly includes a plurality of magnets operatively associated with magnetically conductive plate, commonly known as a back iron. The magnets extend from a common side of the back iron. The back iron is dimensioned and configured to substantially conform to magnetic flux that travels through the back iron when the magnet assembly is exposed to a magnetic field, such as from windings of a motor path. In one particular aspect of the present invention, a cross-sectional dimension of the back iron varies between opposed ends of the back iron as a function of the position and/or orientation of the magnets. For example, a thickness of the back iron is greater at locations between adjacent pairs of the magnets than at locations generally centered with the respective magnets. As a result of such back iron geometry, force output to moving mass ratio of a motor incorporating the magnet assembly is improved over conventional configurations of magnet assemblies. Also, the back iron geometry reduces leakage flux.

Another aspect of the present invention provides a linear motor system that includes a path having a plurality of windings, which can be energized to produce desired magnetic fields. The linear motor system also includes a magnet assembly, such as described above. The linear motor system achieves high performance because the magnet assembly has a reduced mass, which substantially conforms to magnet flux lines that travel through the magnet assembly during energization of path windings. The mass further can be reduced by employing generally elongated octagonal magnets, such as by removing corner portions from rectangular magnets.

According to yet another aspect, a magnet assembly can be used in a linear motor arrangement in such a way so as to generate a Halbach array. A Halbach array can be achieved by a special formation of magnets using 90-degree angles to direct each individual magnet's field in alternating vertical and horizontal orientations, such that half of the magnets are vertically polarized (e.g., perpendicular to a direction of motion of the linear motor), while the other half of the magnets are horizontally polarized, permitting maximization of the magnetic field produced thereby in a desired direction. Additionally, remnant fields that do not contribute to force output in a horizontal direction can be cancelled. This magnet arrangement can be formed as a reduced mass magnet assembly as described above, and can further concentrate magnetic flux in a desired direction while simultaneously mitigating the effects of stray magnetic fields.

According to another aspect, a platen and forcer system is provided. The system employs the reduced mass magnet assembly as previously described. Additionally or independently, other features of the forcer system are modified so as to further optimize magnetic flux capacity in a desired direction. For example, the system can comprise magnetically conductive backing materials fashioned from solid stock, laminations, and/or combinations of smaller stock, or by other known means, such as as sintering, etc., with a varied cross-sectional thickness comprising peaks and valleys, and a plurality of magnets associated therewith such that the center of each magnet is generally aligned with a valley (e.g., a relatively thinner region of the metal backing). The plurality of magnets can be arranged to generate a Halbach array that maximizes output force in a desired horizontal direction and minimizes and/or cancels magnetic fields that do not contribute to force output in the desired horizontal direction. Furthermore, the platen and forcer system mitigates shielding requirements when employed in conjunction with the Halbach array magnet arrangement, making the system highly suitable for manufacturing applications such as e-beam lithography, focused ion beam systems, and the like. For instance, an electron beam employed to etch, inspect, and/or otherwise fabricate a semiconductor wafer can be adversely affected by stray static and alternating magnetic fields, which results in intricate shielding requirements and its complex design when traditional platen and forcer systems are employed. To mitigate a need for elaborate shielding, the subject systems and methods can employ the Halbach magnet arrangement, which can facilitate reducing costs and improving throughput in such fabrication environments. It will be appreciated that any type of linear motor (e.g., iron core motors, ironless motors, . . . ) can be utilized in conjunction with the various aspects set forth herein.

According to still another aspect, a reduced-mass magnet assembly is described for a rotary motor to facilitate performance improvement and/or enhancement. For example, various aspects can be employed in conjunction with a moving-magnet rotary motor, such as an interior rotor brushless permanent magnet motor, wherein a stator has a core and houses a plurality of coils and magnets are deployed on a rotor. Said stator and rotor may be constructed of laminations or solid magnetically conductive material.

Additionally and/or alternatively, such aspects can be employed in conjunction with a moving-coil rotary motor, such as an exterior-rotor brushless permanent magnet motor, wherein a rotor houses a plurality of coils and magnets are deployed on a stator. According to related aspects, any combination of rotating and stationary coils and magnets can be employed. For instance, the motor can be fashioned with rotating magnets and stationary coils and/or stationary magnets and rotating coils. In one aspect, an annular ring with magnets mounted thereon can be modified to optimize magnetic flux in a given direction. For example, a plurality of magnets can be operatively associated with a magnetically conductive annular ring with a varied cross-sectional thickness such that peaks and valleys are formed generally throughout the cross-sectional dimension. The plurality of magnets can be dispersed such that each magnet generally aligns with a valley region of the annular ring to facilitate aligning the valleys with magnetic flux lines generated by the magnets.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention provides a magnet assembly for use in a linear motor. The magnet assembly includes a back iron and an array of magnets. The back iron is in the form of a plate having opposed surfaces of the back iron. The magnets are arranged in a generally linear array along one of the surfaces. The other surface of the back iron plate is dimensioned and configured according to the magnetic field distribution and/or localized regions of saturation associated with the motor geometry/topology. For example, the surface of the back iron plate opposite to which the magnets are attached can be scalloped, such that a dimension between the opposed surfaces at locations generally aligned with the magnet centers is less than a dimension between the opposed surfaces at locations between adjacent magnets.

Additionally, the subject invention can be employed in conjunction with a rotary motor, a platen and forcer arrangement, and/or any other suitable arrangement in which the various aspects described herein . . .

Figure 1:
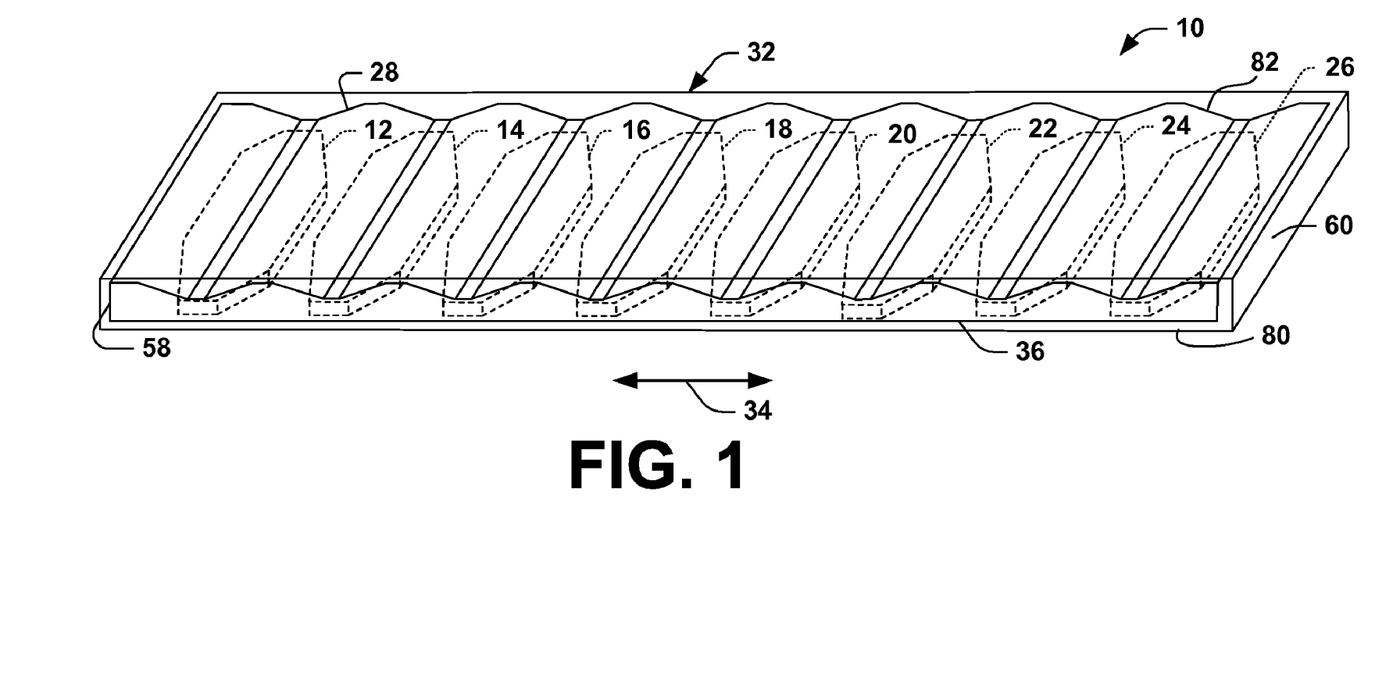
FIG. 1 is an isometric view of a moving magnet assembly in accordance with an aspect of the present invention.
Figure 2:
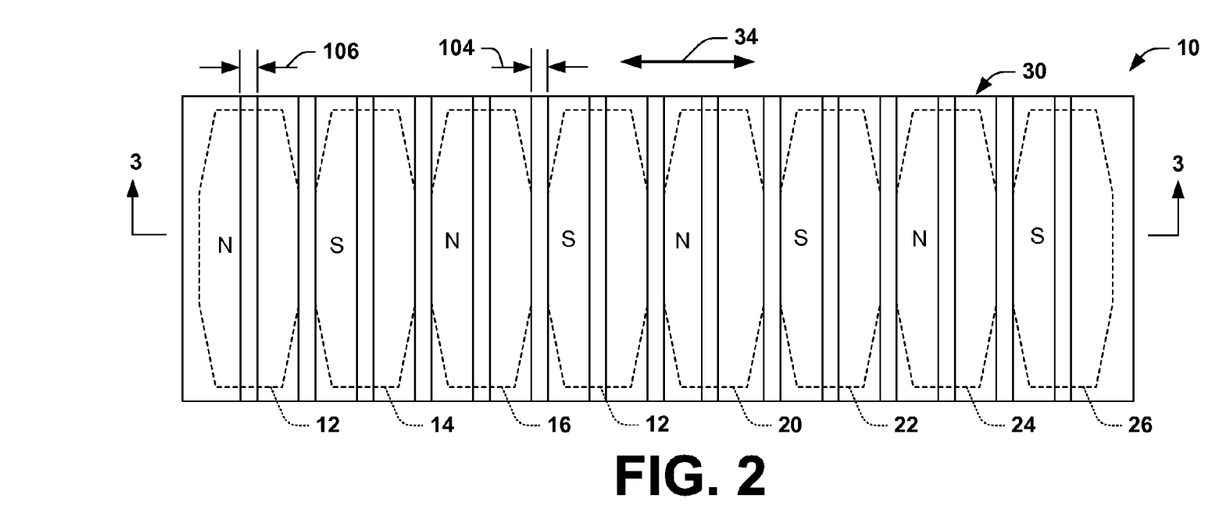
FIG. 2 is a top elevation of the magnet assembly of FIG. 1.
Figure 3:
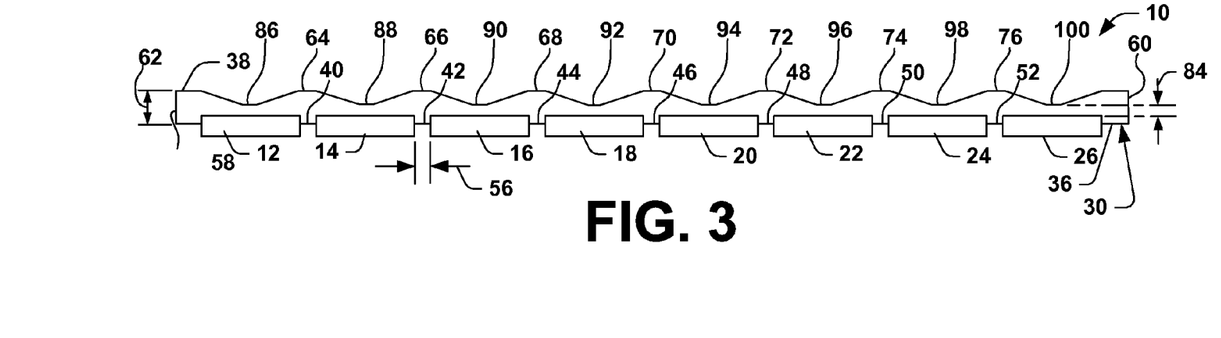
FIG. 3 is a side sectional view of the magnet assembly taken along line 3-3 of FIG. 2.

FIGS. 1, 2 and 3 illustrate a magnet assembly 10 in accordance with an aspect of the present invention. The magnet assembly 10 includes an array of permanent magnets 12, 14, 16, 18, 20, 22, 24, and 26 of alternating magnetic polarity (see FIG. 2). The magnets 12-26 are arranged in a substantially parallel relationship to each other and mounted to a generally rigid and magnetically conductive plate 30, commonly referred to (and hereinafter referred to) as a back iron. The alternating polarity facilitates the flow of magnetic flux through the magnets 12-26 and the back iron 30. The assembly 10 also includes an outer support structure 32 of a suitable non-conducting material, such as an epoxy or a polymer material. The support structure 32 helps hold the magnets 12-26 and back iron 30 in a desired relationship.

FIG. 2 is a top elevation of the magnet assembly of FIG. 1 in which the support structure 32 has been removed. As shown in FIG. 2, the magnets 12-26 have a generally rectangular geometry and are spaced apart from each other by a predetermined distance. The magnets 12-26 have long axes, which are oriented generally perpendicular to a desired direction of travel for the assembly 10, indicated at 34, and which are aligned substantially parallel to each other. To provide desired flux distribution, the corners of each of the magnets 12-26 have been chamfered to form magnets having elongated octagonal geometries, such as shown in FIG. 2. The precise configuration can vary depending on the size of the magnets 12-26, the size of the motor in which the assembly is to be employed as well as the desired characteristics for the motor. In this example, the illustrated magnet geometry also helps reduce the mass of the magnet assembly 10. By way of example, the magnets are formed of a NdFeB material or other type of high performance permanent magnetic materials.

Referring to the side-sectional view of FIG. 3, the 12-26 magnets are mounted to and extend from a common side 36 of the back iron 30. The back iron 30 also includes another side 38 opposite the side 36 to which the magnets 12-26 are mounted. In particular, the magnets 12-26 are positioned in slots or receptacles on the side 36, which are dimensioned and configured to receive a portion of the respective magnets therein. Adjacent pairs of the slots define notches 40, 42, 44, 46, 48, 50, and 52 of the back iron material that extend between adjacent pairs of magnets. The notches 40-52 operate to separate adjacent pairs of the magnets 12-26 by a predetermined distance, indicated at 56, which corresponds to the width of the respective notches. For example, less than one-half the width of the magnets 12-26 are recessed into the back iron 30, such that more than one-half the width of the magnets extend outwardly from the side 36 of the back iron 30. The notches 40-52 and remaining surface of the side 36 are generally coplanar, although other shapes and configurations could be used in accordance with an aspect of the present invention. Also, the notches 40-52 act as retainers locking the magnets in place providing the desired stiffness. However, it will be appreciated by those skilled in the art that the back iron 30 may be designed without notches 40-52 (e.g., in a scenario in which the magnets 12-26 are affixed to back iron 30 with an adhesive or other suitable means), in order to further reduce the weight of the magnet assembly.

In accordance with an aspect of the present invention, a cross-sectional dimension of the back iron 30 varies along its length between spaced apart ends 58 and 60 so as to substantially conform to the magnetic flux generated during operation of a motor that includes the magnet assembly 10. In the example of FIG. 3, the thickness of the back iron 30 between the opposed sides 36 and 38 is greater at locations between adjacent pairs of the magnets 12-26 than at locations generally aligned with centers of the respective magnets. The back iron 30 can be formed of substantially any generally rigid material capable of conducting a magnetic field, so as to help form a magnetic circuit formed of the magnets 12-26 of different polarities and associated motor windings (not shown).

For example, the back iron 30 is formed of a non-linear material having a high magnetic permeability and desired saturation characteristics. In a particular aspect of the present invention, the back iron is formed of vanadium permeadur (e.g., cobalt—48.75%, Vanadium—2%, Carbon—0.004%, Manganese—0.05%, Silicon—0.05%, Iron—balance), which has particularly high saturation characteristics compared to other non-linear materials. While such material is considerably more expensive than steel, its superior magnetic properties are desirable in ultra-high performance motors according to the present invention. It is to be understood and appreciated that a high performance magnet assembly, in accordance with an aspect of the present invention, could employ other types of non-linear materials (e.g., M19 steel) than vanadium permeadur.

By way of illustration, the back iron 30 has a maximum thickness, indicated at 62, at its ends 38 and 30 and at locations 64, 66, 68, 70, 72, 74, and 76 between adjacent pairs of magnets 12-26. In the example of FIG. 3, the locations 64-76 having the maximum thickness 62 are substantially coextensive with the notches 40-52. Additionally, the side 38 of the back iron 30 at the ends 58 and 60 and at the locations 64-76 are generally coplanar and substantially parallel to the other side 36 of the back iron. It is to be appreciated, however, that back iron other shapes (e.g., curved in the direction of travel) also could be utilized in accordance with an aspect of the present invention. Thus, as shown in FIGS. 1 and 2, the side 38 defines generally rectangular and coplanar strips extend between side edges 80 and 82 of the back iron 30 at the ends 58 and 60 and at the locations 64-76.

The back iron 30 further has a minimum thickness, indicated at 84, at locations 86, 88, 90, 92, 94, 96, 98, and 100 substantially centered with the long axes of the respective magnets 12-26. In the example of FIG. 3, the locations 86-100 have the minimum thickness 84, which define generally rectangular planes or strips in the side surface 38 spaced from and substantially parallel to the magnets 12-26 over which the respective locations are positioned. The locations generally rectangular strips, which can be coplanar, extend between the side edges 80 and 82 of the back iron 30.

The portions of the side 38 extending between the locations of maximum thickness (e.g., the ends 58 and 60 and the locations 64-76) and the locations of minimum thickness 86-100 slope upwardly and downwardly to provide a desired scalloped or sawtooth cross section, as illustrated in FIG. 3. That is, the locations (or strips) 64-76 and 86-100 respectively provide alternating peaks and valleys along the surface 38 of the back iron.

Referring to FIG. 2, each of the locations 64-76 of maximum back iron thickness has a width 104 in the direction 34, which width is greater than or equal to zero. Similarly, each of the locations 86-100 of minimum back iron thickness has a width 106 in the direction 34, which width is greater than or equal to zero. Accordingly, while the locations of maximum and minimum thickness are illustrated as generally planar and parallel to the side 36, those skilled in the art will understand and appreciated that virtually any widths 104 and 106 can be employed to provide different varying cross-sectional configurations for the back iron in accordance with an aspect of the present invention. Additionally or alternatively, while the locations 64-76, the locations 86-100 and the portion of the side surface extending therebetween are illustrated as generally planar surfaces, it is to be appreciated that one or more of such surface portions could be curved in accordance with an aspect of the present invention.

Figure 4:
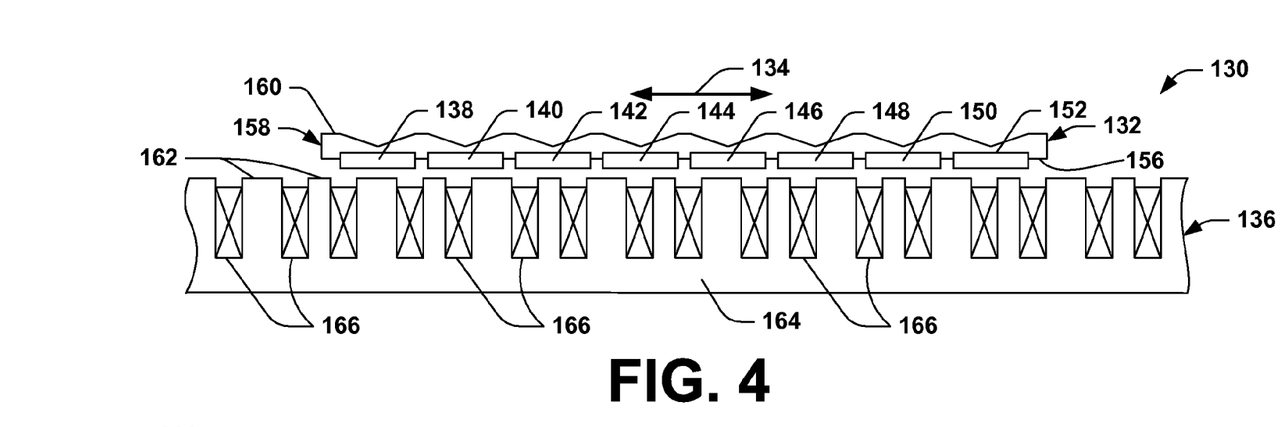
FIG. 4 is side sectional view of part of a linear motor in accordance with an aspect of the present invention.

FIG. 4 illustrates a cross-sectional view of a linear motor system 130 in accordance with an aspect of the present invention. The system 130 includes a moving magnet assembly (or stage) 132 that is moveable in a direction of travel, indicated at 134, relative to a path 136. For example, the magnet assembly 132 is supported relative to the path 136 for movement in the direction 134, such as by low or no friction bearings (e.g., air bearings, not shown) to provide a desired air gap between the magnet assembly and the path.

The magnet assembly 132 includes a plurality of magnets 138, 140, 142, 144, 146, 148, 150, and 152, which are attached to and extend from a common side 156 of a back iron 158. An opposite side 160 of the back iron 158 is dimensioned and configured to conform to flux lines of a magnetic circuit formed between the magnet assembly and the path when the path is energized. That is, the thickness of the back iron 158 between the opposed sides 156 and 160 is greater at locations between adjacent pairs of the magnets 138-152 than at locations generally aligned with centers of the respective magnets. As a result, the side surface 160 has a generally scalloped or ribbed appearance between its ends; e.g., it is formed of alternating peaks and valleys between spaced apart ends of the back iron. The particular cross-sectional configuration of the back iron can vary, such as described herein.

The path 136 includes a plurality of spaced apart teeth 162 that extend from a base portion 164 toward the magnet assembly 132 located above the path 136. Typically, the teeth 162 are oriented substantially parallel relative to each other and to the magnets 138-152. The path 136 also includes windings 166 disposed around selected teeth. The windings 166 could be pre-wound coil assemblies or wound in-situ around the teeth 162.

Those skilled in the art will understand and appreciate that the linear motor system typically includes a motor controller programmed and/or configured to control operation of the motor system 130. For example, an encoder or other positioning system provides the controller with position information, based on which the controller controls energization of the associated windings 166 to effect desired movement of the magnet assembly 132 relative to the path. Those skilled in the art further will understand and appreciate various configurations of paths 136 and coil windings that could be utilized in combination with a magnet assembly in accordance with an aspect of the present invention.

Figure 5:
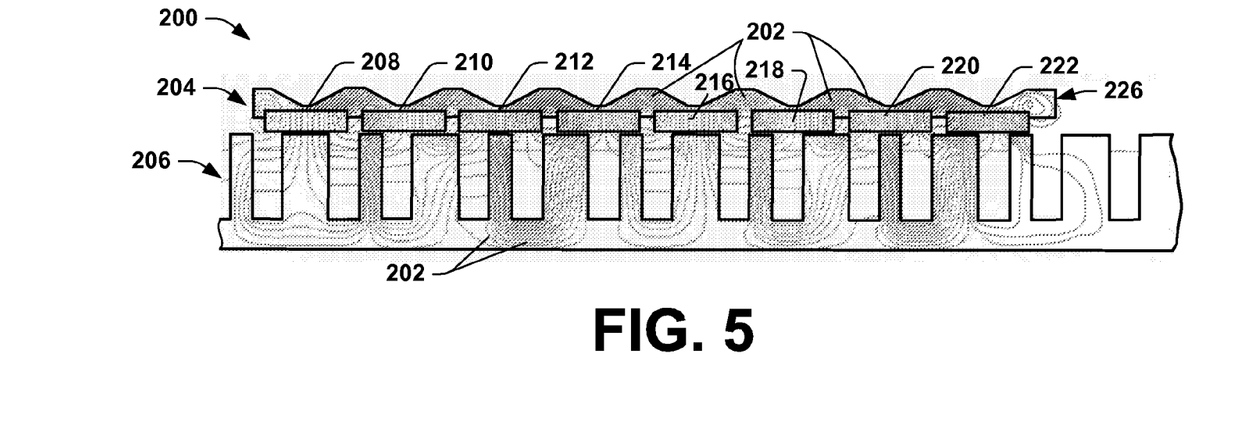
FIG. 5 is a side sectional view similar to FIG. 4, illustrating magnetic flux lines for an energized linear motor in accordance with an aspect of the present invention.

FIG. 5 depicts a graphical representation of part of linear motor system 200, similar to that shown in FIG. 4, illustrating magnetic flux lines 202 for magnet circuits formed by a magnet assembly 204 and energized windings of a motor path 206 in accordance with an aspect of the present invention. The magnet assembly 204 includes a plurality of permanent magnets 208, 210, 212, 214, 216, 218, 220, and 222 that are operatively coupled to a back iron 226.

In accordance with an aspect of the present invention, as shown in FIG. 5, the back iron 226 is dimensioned and configured to conform to the magnet flux lines that travel through the magnetic circuits formed of the magnet assembly and the path 206. The back iron 226 has a greater cross-sectional dimension at locations at ends of the magnet assembly 204 and between adjacent pairs of magnets than at the locations generally centered with the respective magnets. Consequently, the overall mass of the moveable magnet assembly 204 is less than if such portions had not been removed. Additionally, because the selected portions have been removed according to the magnetic flux lines during energization of the path windings, the forces generated between the assembly 204 and the path remain substantially unchanged from a back plane that would include a substantially planar surface opposite the magnets.

To further reduce the mass of the magnet assembly, the magnets can be configured to have chamfered corners, so as to provide a generally elongated octagonal geometry. The particular dimensions and configuration of magnets and back iron can be further optimized based on magnetic finite element analysis. As a result, under Newton's law, the acceleration of the magnet assembly 204 relative to the path 206 is increased by an amount proportional to the reduced mass of the magnet assembly. Additionally, the geometry further provides flux distribution that is substantially sinusoidal distribution, which mitigates total harmonic distortion (THD). A lower THD corresponds to a more efficient motor.

Figure 6:
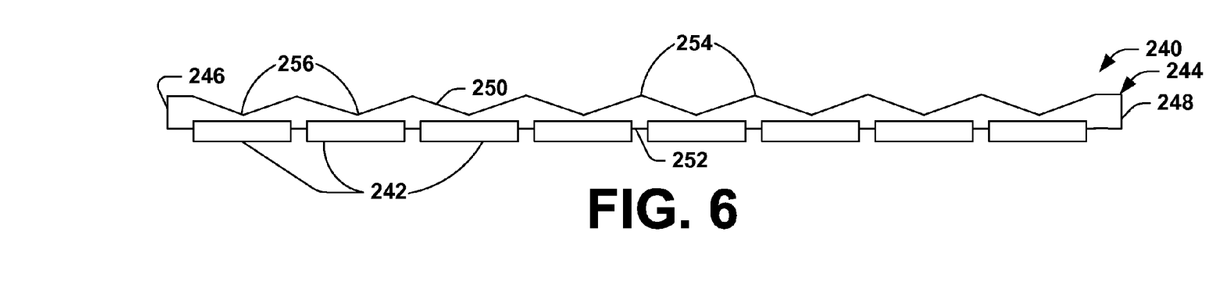
FIG. 6 is a side sectional view of a motor magnet assembly in accordance with another aspect of the present invention.
Figure 7:
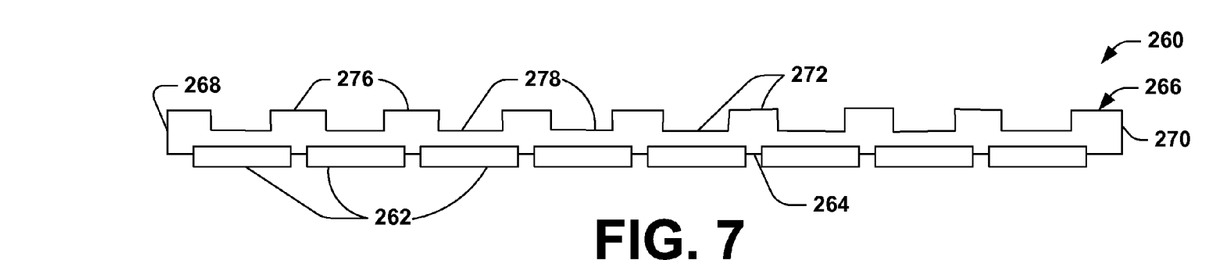
FIG. 7 is a side sectional view of a motor magnet assembly in accordance with another aspect of the present invention.
Figure 8:
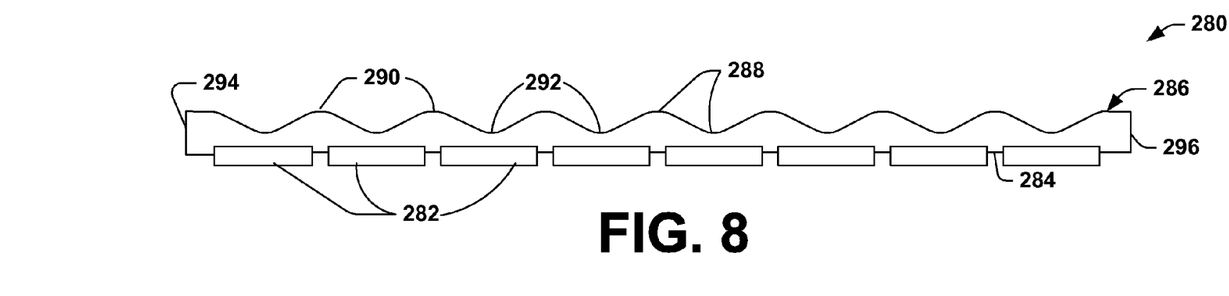
FIG. 8 is a side sectional view of a motor magnet assembly in accordance with another aspect of the present invention.

As mentioned above, it is to be appreciated that various configurations of magnet assemblies can be implemented in accordance with an aspect of the present invention. FIGS. 6-8 illustrate some examples of other configurations of magnet assemblies that can be utilized. It will be understood and appreciated that such examples are solely for illustrative purposes and that numerous other possible configurations exist, all of which are within the scope of the appended claims.

FIG. 6 illustrates a magnet assembly 240 for use in a linear motor in accordance with an aspect of the present invention. The assembly 240 includes a plurality of elongated permanent magnets 242 operatively coupled to a back iron 244. As shown in FIG. 6, a cross-sectional dimension of the back iron 244 varies along its length between spaced apart end portions 246 and 248 of the back iron. In particular, a side surface 250 of the back iron 244 opposite a side 252 to which the magnets 242 are attached has a substantially triangular or sawtooth geometry having alternating peaks 254 and valleys 256. The other side 252 is generally planar, although it includes slots or receptacles in which a portion of the respective magnets 242 is received. As a result of such back iron 244 configuration, the thickness of the back iron at locations between adjacent pairs of magnets 242 and at the end portions 246 and 248 is greater than its thickness at locations generally centered with the long axes of the respective magnets.

The geometry of the back iron 244 substantially conforms to magnetic flux lines that travel through the back iron from the magnets so as to provide extremely high flux densities. The geometry further enables the back iron 244 to have a reduced mass. The magnets also can be configured to have chamfered corners, so as to provide a generally elongated octagonal geometry, such that the mass of the magnet assembly is further reduced. The combination of high flux densities and reduce back iron mass result in a high performance motor capable of achieving rapid acceleration compared to conventional linear motors of similar size.

FIG. 7 illustrates a magnet assembly 260 for use in a linear motor in accordance with another aspect of the present invention. The assembly 260 includes a plurality of elongated permanent magnets 262 operatively coupled at a side surface 264 of a back iron 266. The back iron 266 has a cross-sectional dimension that varies along its length between spaced apart end portions 268 and 270 in accordance with an aspect of the present invention. In particular, a side surface 272 of the back iron 244 opposite the side 264 to which the magnets 262 are attached has a plurality of substantially elongated rectangular peaks (or protrusions) 276. The peaks 276 extend between side edges of the back iron. That is, the side 272 has alternating rectangular peaks 276 and valleys 278 to provide a generally square wave cross-sectional geometry between the end portions 268 and 270. The peaks 276 are generally centered over spaces between adjacent pairs of the magnets 262 and the valleys are generally centered over the long axes of the respective magnets. The side 264 is generally planar, although it includes slots or receptacles in which a portion of the respective magnets 262 is received.

As a result of such geometry for the back iron 266, the thickness of the back iron at locations between adjacent pairs of magnets 262 and at the end portions 268 and 270 is greater than its thickness at locations generally centered with the magnets. This geometry substantially conforms to magnetic flux lines that travel through the back iron 266 from the magnets 262 so as to provide extremely high flux densities, such as when associated windings of a motor incorporating the magnet assembly 260 are energized. The geometry further enables the back iron 266 to have a reduced mass. The combination of high flux densities and reduced back iron mass result in a high performance motor capable of achieving rapid acceleration compared to conventional linear motors of similar size.

FIG. 8 depicts yet another magnet assembly 280 in accordance with an aspect of the present invention. The magnet assembly includes a plurality of permanent magnets 282 operatively connected to a generally planar side surface 284 of a back iron 286. Specifically, a portion of the magnets 282 can be received in associated slots or receptacles formed in the side 284, although the magnets could be attached to the back iron in the absence of such slots.

In accordance with an aspect of the present invention, a side surface 288 of the back iron 286 opposite the side 284 to which the magnets are connected is dimensioned and configured to substantially conform to magnetic flux lines associated with the magnet assembly when exposed to magnetic fields from energized windings of an associated motor path (not shown). In the example of FIG. 8, the side surface 288 has alternating peaks 290 and valleys 292 to provide a generally sinusoidal cross-sectional configuration between spaced apart end portions 294 and 296 of the back iron 286. The peaks 290 are generally centered over spaces located between adjacent pairs of magnets 282 and the valleys 292 are generally centered over corresponding centers of the respective magnets.

As a result of the back iron geometry shown in FIG. 8, the magnet assembly 280 is able to complete magnetic circuits in an associated linear motor so as to provide extremely high flux densities, such as when associated windings of the motor incorporating the magnet assembly are energized. The geometry further provides the back iron 286 with a reduced mass. To further reduce the mass of the magnet assembly, the magnets 282 can be configured as a generally elongated octagon, such as by removing corner portions of the magnets. The combination of high flux densities and reduced back iron mass result in a high performance motor capable of achieving rapid acceleration compared to conventional linear motors of similar size.

Figure 9:
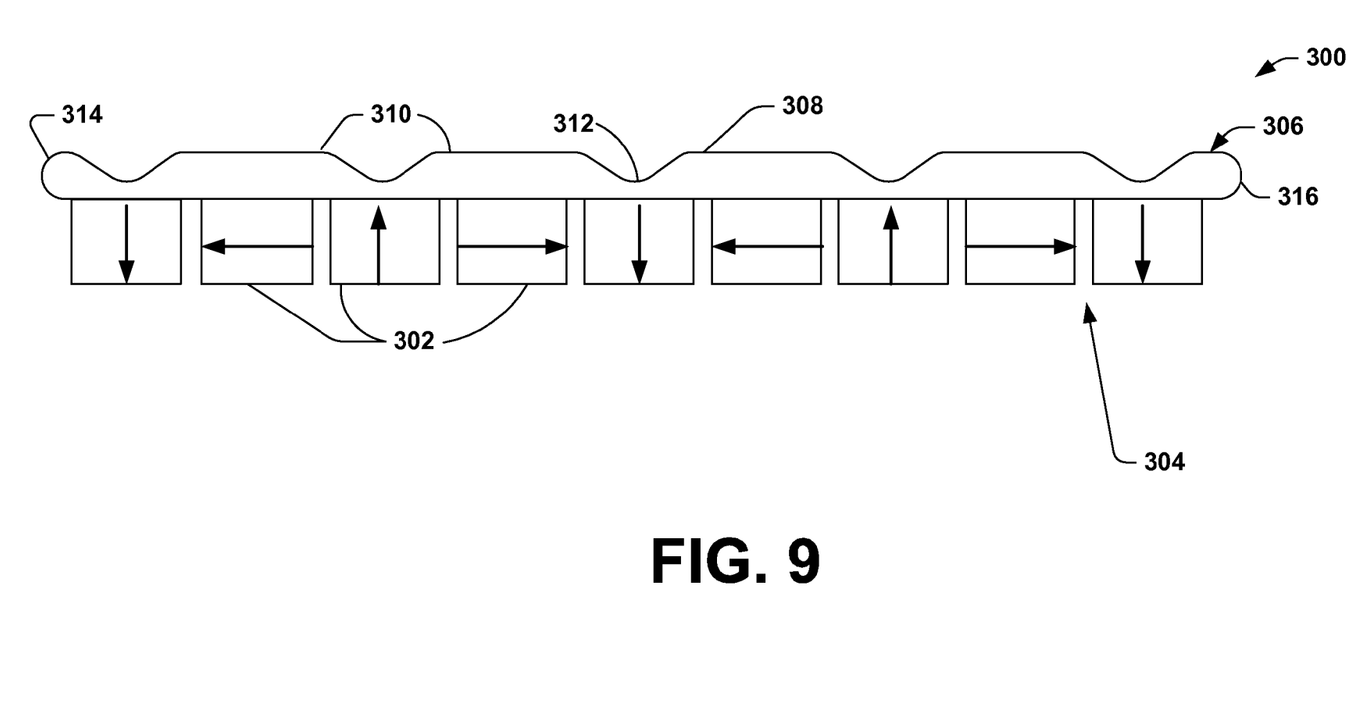
FIG. 9 is a side section view of a motor magnet assembly in accordance with various aspects set forth herein, showing a typical orientation, such as in a Halbach array.

FIG. 9 illustrates yet another magnet assembly for use in a motor in accordance with various aspects. A plurality of magnets 302 can be arranged on side 304 of back iron 306 in such a way so as to generate a Halbach array. The back iron 306 consists of peaks 310 and valleys 312 on side 308 between spaced apart end portions 314 and 316. The plurality of magnets 302 are shown with directional arrows indicating the polarization of each of the respective magnets. The arrangement shown facilitates concentration of the magnetic field below the magnets 302 and cancels out any remnant magnetic field above the magnets 302 resulting in a low stray magnetic field. Cancellation of magnetic field effects in undesired locations prevents interference to the overall force output of the magnet assembly 300.

With further reference to FIG. 9, side 308 of back iron 306 consists of peaks 310 and valleys 312 so as to reduce the mass of the magnet assembly while at the same time optimizing magnetic flux through the back iron 306. Peaks 310 and valleys 312 provide a generally sinusoidal cross-sectional configuration between spaced apart end portions 314 and 316 of the back iron 306. However, it will be appreciated that the cross-sectional shape of the peaks 310 and valleys 312 can be triangular, saw-toothed, shaped as a square-wave, etc., or any other suitable shape that facilitates reducing mass while retaining sufficient rigidity. The peaks 310 are positioned over spaces located between adjacent pairs of magnets 302 of the Halbach array, while valleys 312 are generally centered over corresponding centers of the respective magnets 302. It will further be appreciated that, in accordance with various other aspects, the back iron can be designed to have a fixed thickness, and magnets positioned therein can have varied thicknesses to reduce mass associated with the assembly.

Figure 10:
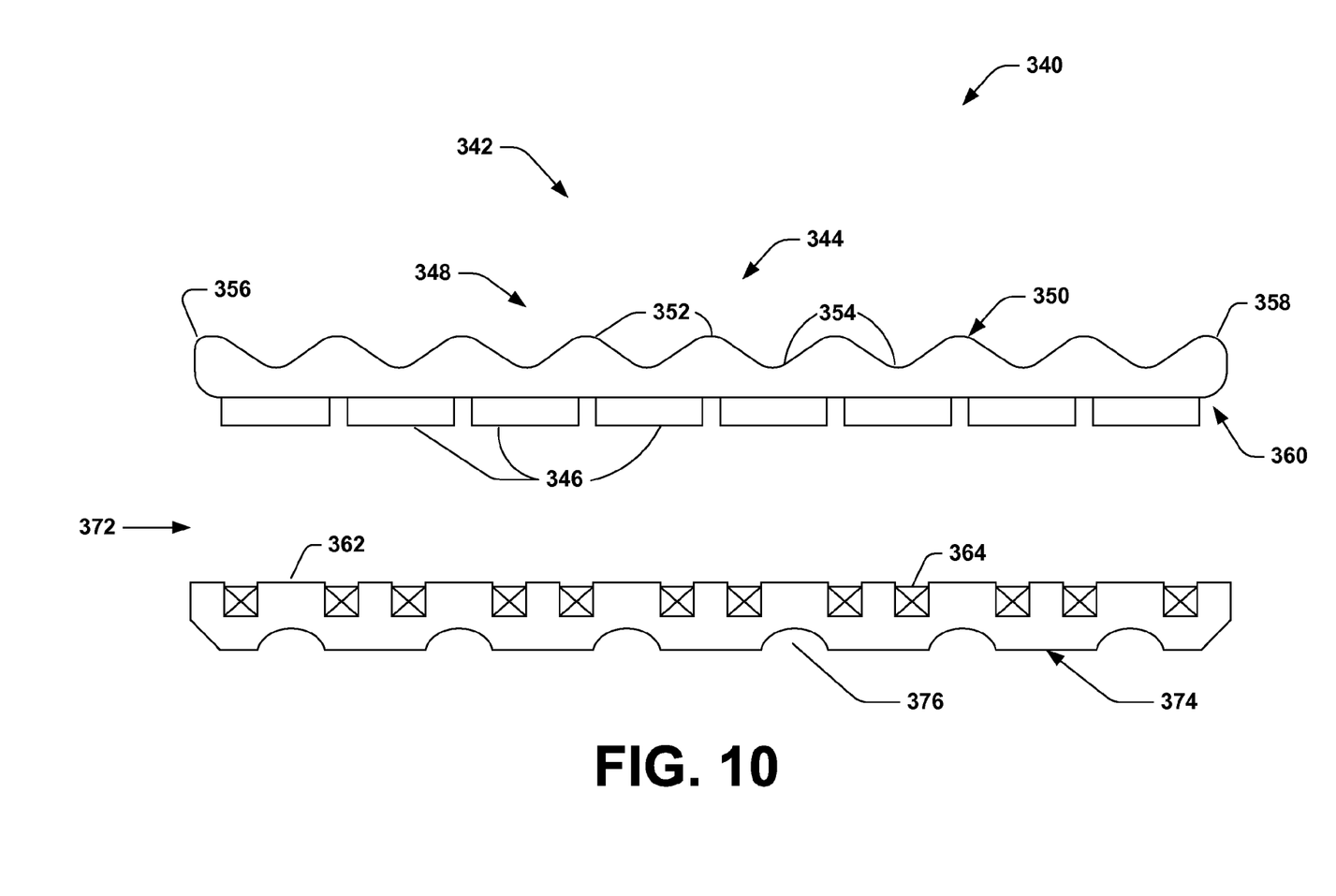
FIG. 10 illustrates a platen and forcer motor system in accordance with various aspects.

FIG. 10 is an illustration of a platen and forcer linear motor system 340. Forcer 342 includes magnet assembly 344, which comprises a plurality of magnets 346 arranged in spaced relation to each other on side 360 of conductive metal backing 348. Side 350 of metal backing 348 shows peaks 352 and valleys 354 in between ends 356 and 358. This modification to backing 348 allows for a reduction in total mass of the forcer 342, thus permitting optimized acceleration capabilities along platen 374. Platen 374 can be, for example, a solid platen, a laminated platen, or any other suitable platen configuration, as will be appreciated by one skilled in the art. It is further to be appreciated that the plurality of magnets 346 can additionally be adapted to possess polarization characteristics such that a Halbach array is formed. According to this aspect, the magnetic field generated by the Halbach array would be optimally concentrated in air gap 372 between the forcer 342 and platen 374. This arrangement allows for maximal efficiency with respect to strength of the magnetic field in a vertical direction because remnant magnetic fields in an undesired location (e.g. horizontally) will be cancelled.

The system 340 comprises a forcer 342 and associated magnet assembly 344 that is moveable in multiple directions of travel. For example, the magnet assembly 344 can be supported for movement in various directions about the platen, such as by low or no friction bearings (e.g., air bearings, not shown) to provide a desired air gap 372 between the magnet assembly 344 and the platen 374. The magnet assembly 344 can comprise a plurality of magnets 346, which are attached to and extend from a common side 360 of a metal backing 348. An opposite side 350 of the metal backing 348 is dimensioned and configured to conform to flux lines of a magnetic circuit formed between the magnet assembly 344 and the platen 374 when the platen 374 is energized. That is, the thickness of the metal backing 348 between the opposed sides is greater at locations between adjacent pairs of the magnets 346 than at locations generally aligned with centers of the respective magnets. As a result, the top surface 350 has a generally scalloped or ribbed appearance between its ends; e.g., it is formed of alternating peaks 352 and valleys 354 between spaced apart ends of the backing 344. The particular cross-sectional configuration of the backing can vary, such as described herein. Furthermore, in accordance with various other aspects, the forcer 342 can be designed to have a fixed thickness, and magnets 346 positioned therein can have varied thicknesses, varied lengths, and/or varied widths, to reduce mass associated with the assembly 344.

The platen 374 comprises a plurality of spaced apart teeth 362 that extend from a base portion toward the magnet assembly 344 located above the platen 374. Typically, the teeth 362 are oriented substantially parallel relative to each other and to the magnets 346. The platen 374 also comprises windings 364 disposed around selected teeth 362. The windings 364 can be pre-wound coil assemblies or wound in-situ around the teeth 362. Moreover, in order to further reduce mass of the system 340, a plurality of notches 376 can be provided in the bottom of the platen 374. Those skilled in the art will understand and appreciate that the platen and forcer system 340 can additionally comprise a motor controller programmed and/or configured to control operation of the system 340. For example, an encoder or other positioning system can provide the controller with position information, based on which the controller controls energization of the associated windings 364 to effect desired movement of the forcer 342 relative to the platen 374. Those skilled in the art further will understand and appreciate various configurations of platens 374 and coil windings 364 that can be utilized in combination with a magnet assembly in accordance with various other aspects.

In another aspect, the platen and forcer linear motor system 340 can, for example, be utilized in a semiconductor fabrication process. The system 340 can be used to move a plurality of wafers along an assembly line and/or about an assembly area. By canceling stray magnetic fields using the Halbach array arrangement, shielding requirements associated with conventional platen and forcer systems can be greatly reduced. It is to be appreciated that any known lithography process can be utilized in accordance with the present invention, such as, for instance, electron beam (E-beam) lithography. E-beam lithography is a method that employs an electron beam to form patterns on a wafer. The direction of the electron beam can be altered by stray magnetic fields that are present around the platen and forcer linear motor system 340. Stray magnetic fields can be produced by nearby unattached equipment, magnets and current-carrying coils. Stray magnetic fields can be AC or DC. For instance, local uncoupled stray magnetic fields are generated due to a magnetic field of a permanent magnet and a coil carrying current, such that the sinusoidal excitation of motor phases, magnet motion, the magnetic system, etc., cause magnetic spikes. DC fields are typically non-varying, or slowly varying, and are caused by a permanent magnet. To mitigate the effects of stray magnetic fields, magnets 346 can be arranged such that a Halbach array is generated. This arrangement cancels remnant magnetic fields in undesired directions and concentrates the strength of the magnetic field in the air gap 372 between the forcer 342 and platen 374. It will be appreciated that the air gap 372 is illustrated with an exaggerated width for ease of viewing, and that in practice the air gap 372 may be approximately 0.5 to 1.7 mm wide. Thus, by varying the cross-section of the backing 344 and arranging magnets 346 in a forcer portion 342 of a platen and forcer system 340 to generate a Halbach array, platen and forcer system 340 can be made for use in conjunction with, while facilitating reducing shielding requirements associated with, sensitive static and/or varying leakage components, such as an electron-beam component.

Figure 11:
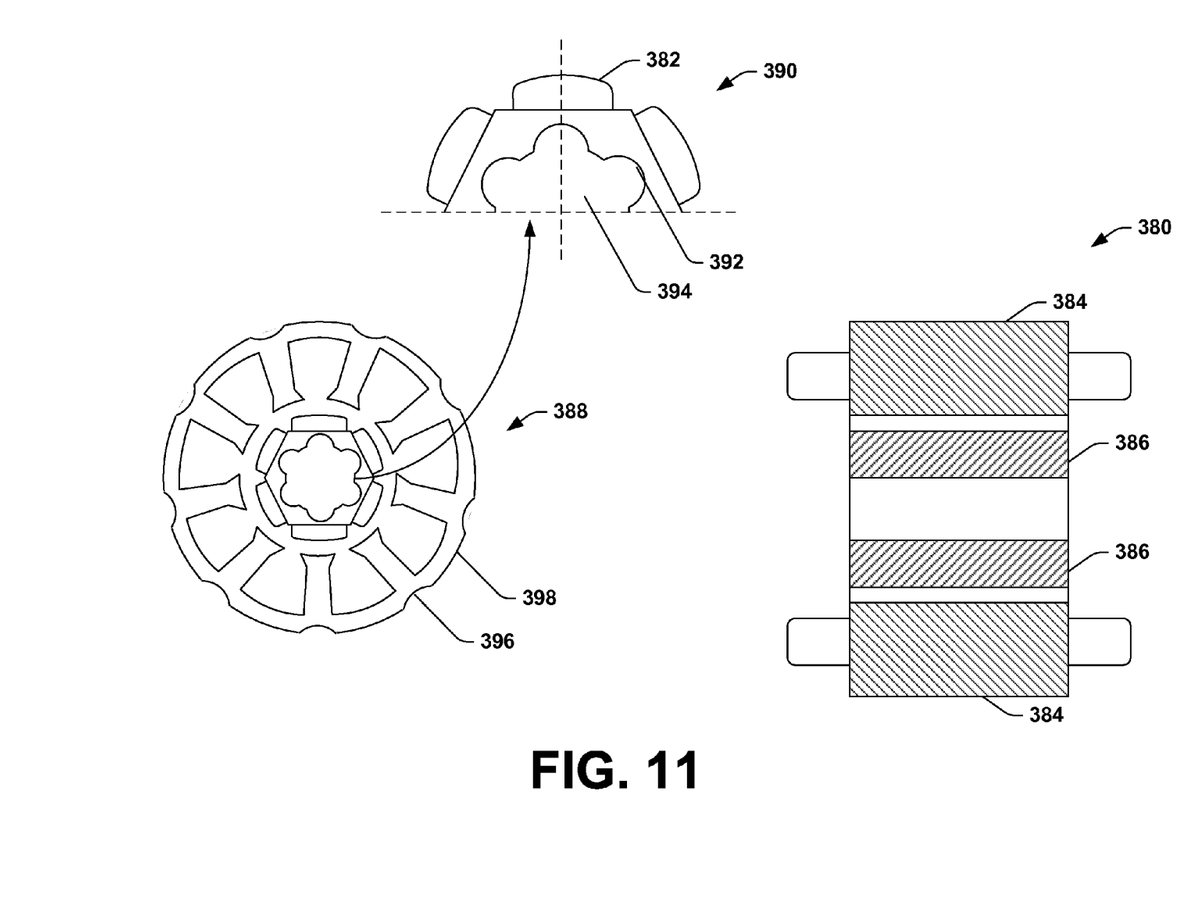
FIG. 11 illustrates an interior-rotor brushless permanent magnet motor that can be utilized in conjunction with a backing of varied cross-section, in accordance with various aspects described herein.

FIG. 11 illustrates an interior-rotor brushless permanent magnet motor 380 that can be utilized in conjunction with a backing of varied cross-section, in accordance with various aspects described herein. Rotary motor systems consisting of a stator and a rotor are well known in the art and are not discussed in detail herein for the sake of brevity. The motor 380 comprises stators 384 with windings and rotor assemblies 386 having a plurality of magnets disposed therein, as illustrated by a cross-sectional view 388 of a rotor 386. A plurality of notches 396 can be provided to facilitate providing a "scalloped" rotor plate 398, in order to reduce mass of the motor 380. Within rotor assembly 386 resides a plurality of magnets 382 positioned in spaced relation to each other, as illustrated in the enlarged view 390 of the rotor assembly cross-section 388. It is to be appreciated that any desired number of magnets can be employed in motor 380. Rotor assembly 386 further comprises a plurality of scalloped rotors 392, which can be arranged in a one-to-one configuration with magnets 382, as well as in any other suitable or desired configuration.

Magnets 382 can be arranged in alternating polarities (e.g., north and south, . . . ). Additionally, it is to be appreciated that magnets 382 can be polarized so as to produce a Halbach array. The Halbach array arrangement of magnets 382 can facilitate canceling remnant magnetic fields in an angular direction (e.g., along the circumference of the rotor assembly) that would detract from the overall force output of the rotary motor. One with skill in the art will additionally appreciate that a core material that makes up the central core 394 of the rotary motor can be composed of any suitable conductive metal, in particular, non-oriented electrical steel. This material is capable of supporting high magnetic flux density and low core losses in high rate of acceleration change applications typical in linear and rotary motor systems. In this example, the utilization of both the Halbach array arrangement and non-oriented electrical steel core material maximizes the concentration of the magnetic field in the core of the motor and further prevents current loss and non-contributory magnetic field effects.

Figure 12:
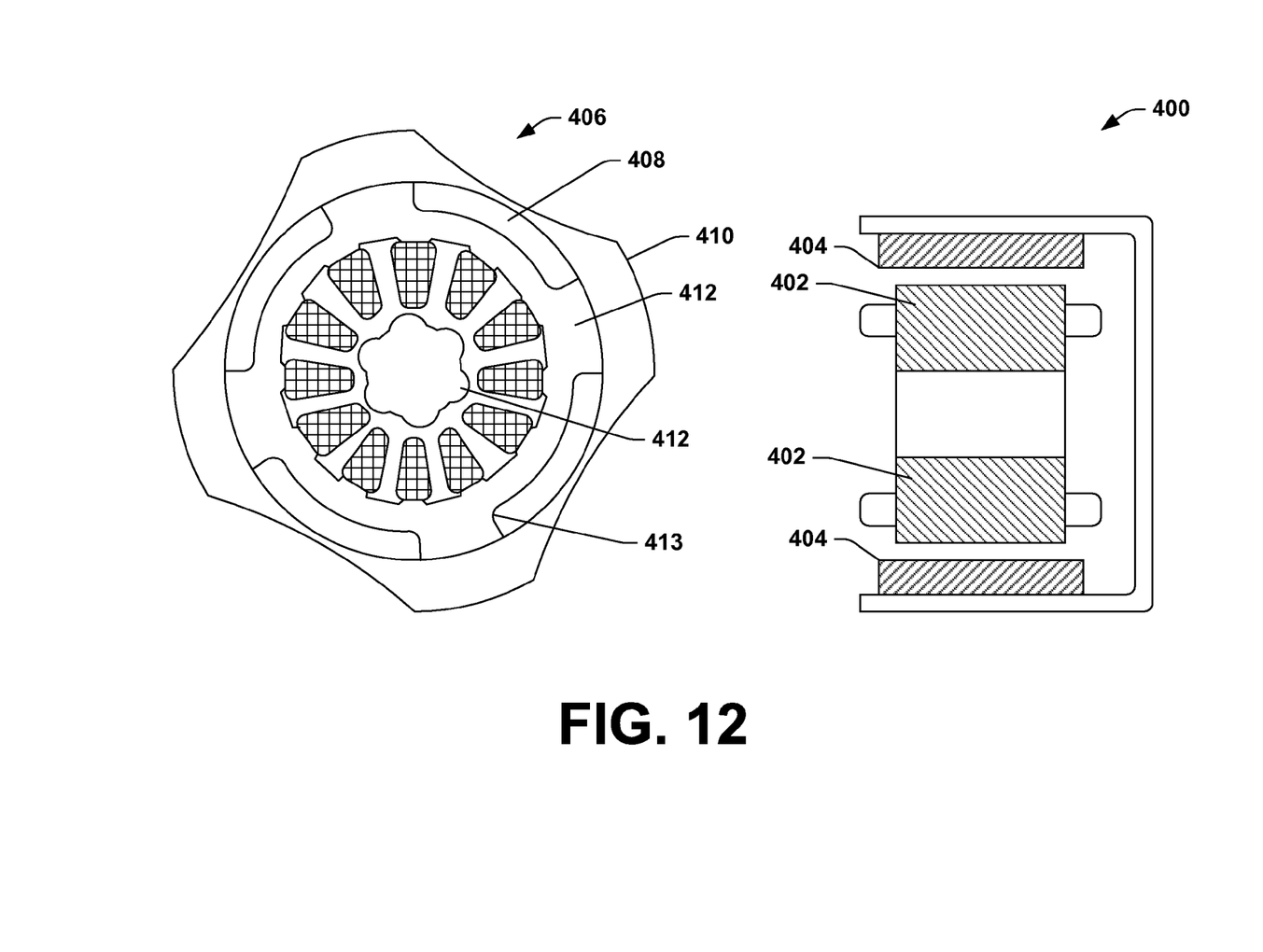
FIG. 12 is an illustration of an exterior-rotor brushless permanent magnet motor that can be utilized in conjunction with a backing of varied cross-sectional width as described herein, in accordance with various aspects.

FIG. 12 is an illustration of an exterior-rotor brushless permanent magnet motor 400 that can be utilized in conjunction with a backing of varied cross-sectional width as described herein, in accordance with various aspects. The motor 400 comprises a pair of stators 402 and a pair of rotor assemblies 404 that are positioned exterior to the stators 402, as opposed to the interior rotor configuration of FIG. 11. A cross-sectional view 406 of a rotor 404 is presented and illustrates a plurality of arc magnets 408 disposed upon an annular ring 410, such that the magnets 408 are positioned in an air gap 412 in the rotor assembly. The annular ring 410 can have a variable thickness, such that the annular ring 410 is thicker in areas generally aligned with gaps between magnets 408, and relatively thinner in areas generally aligned with the centers of magnets 408. In this manner, mass of the motor 400 can be reduced. Additionally, to further reduce motor mass, a plurality of notches 414 can be formed at the interior of the assembly. The arc magnets 408 can be arranged in alternating polarities (e.g., north and south) and/or can be arranged to generate a Halbach array as described above. In accordance with various other aspects, the annular ring 410 can be designed to have a fixed thickness, and magnets 408 affixed thereto can have varied thicknesses to reduce mass associated with the assembly. According to still other aspects, magnets 408 can be designed to have a rounded edge 413 to further reduce mass and/or weight of the motor assembly. Alternatively, the motor topologies described with regard to FIGS. 11 and 12 can be employed in conjunction with a variable cross-section backing, as described below with regard to FIG. 13.

Figure 13:
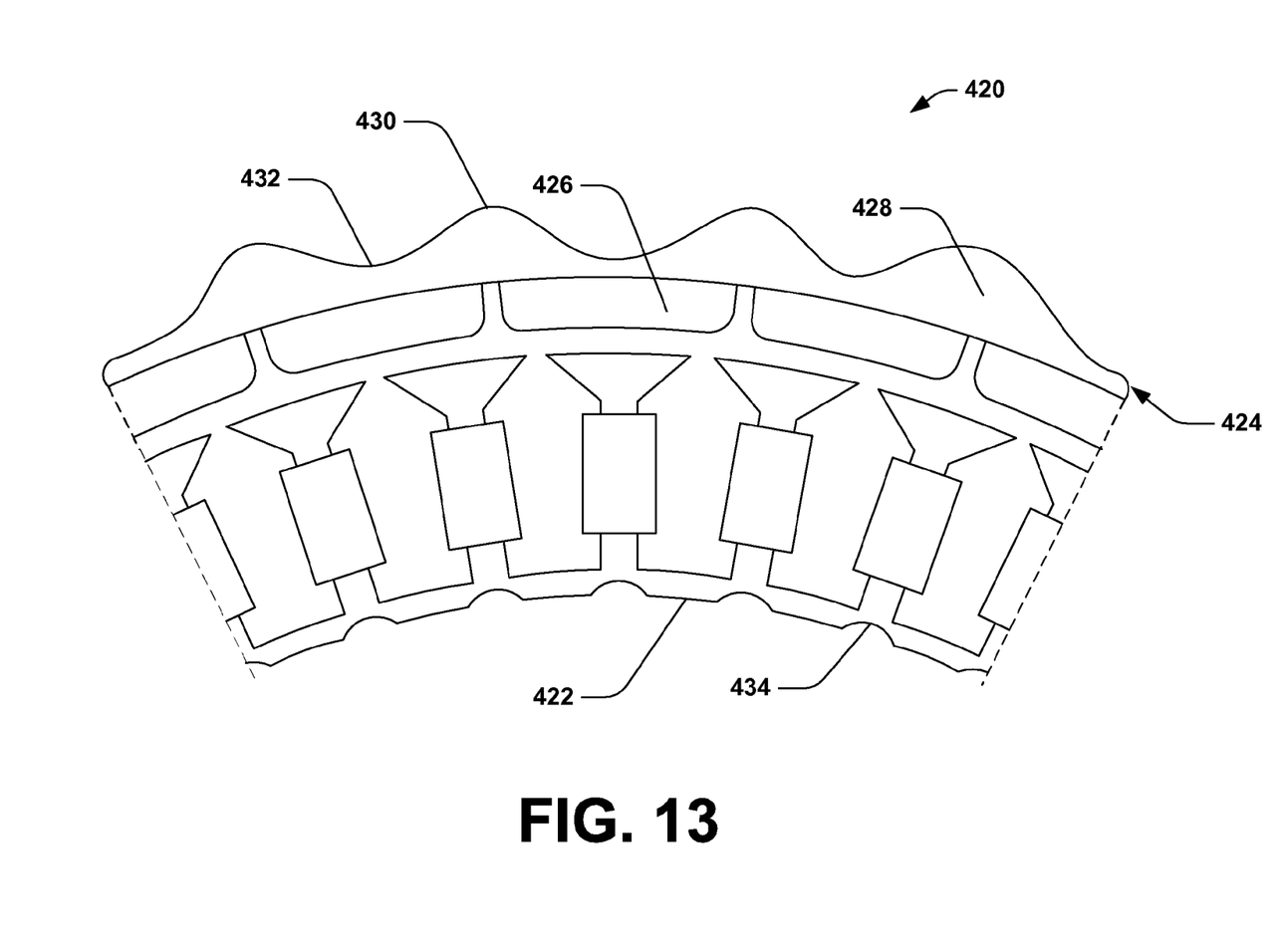
FIG. 13 illustrates a portion of a rotary motor with a backing of varied cross-section, in accordance with various aspects.

FIG. 13 illustrates a portion of a rotary motor 420, such as the motors described with regard to FIGS. 11 and 12, with a backing of varied cross-section, in accordance with various aspects. The motor 420 comprises a stator with windings 422, and a rotor portion 424 comprising a magnetically conductive annular ring 428 that has a plurality of magnets 426 disposed thereon. The magnets 426 can be arranged to have alternating north-south polarity or arranged in any other suitable orientation, as will be appreciated by those skilled in the art.

The annular ring 428 can additionally have a varied cross-sectional dimension. For example, the annular ring 428 can be thinner in areas generally aligned with the centers of magnets 426, and thicker, relatively, in areas generally aligned with the ends of the magnets 426 (e.g., the spaces between magnets 426, . . . ). In this configuration, the annular ring 428 exhibits a plurality of peaks 430 and valleys 432, similar to those described above with regard to various linear motors and/or aspects related thereto. It will be appreciated that the orientation of the peaks 430 and valleys 432 can be generally sinusoidal, crenate, saw-toothed, triangular, square, etc., or any other suitable shape that facilitates reducing mass while retaining rigidity. As previously discussed with respect to magnet assemblies for linear motors, this arrangement of magnets 426 allows for reduction in the overall size of the rotor assembly 424, and further allows the magnets 426 to conform to the magnetic flux lines that travel through annular ring 428 and which are produced by windings associated with a stator 422 of the rotary motor 420. The reduced size of the annular ring still further facilitates increasing acceleration capabilities of the rotor 420. Acceleration capabilities can further be increased by reducing mass on an inner side of the motor 420, which can be achieved by providing a plurality of notches 434 to scallop the inner side of the motor 420.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. For example, a magnet assembly, in accordance with an aspect of the present invention can have different numbers of magnets from that shown and described herein. Additionally, the magnet assembly can have a different contour from the substantially flat configuration shown herein, such as to conform to the contour of the path with which the magnet assembly is to be utilized. Accordingly, the present invention is intended to embrace all such alterations, modifications and variations that fall within the spirit and scope of the appended claims.

What is claimed is:

1. A magnet assembly for a motor comprising:
   a magnetically conductive annular ring with a uniformly varied cross-sectional dimension; and
   a plurality of magnets associated with the magnetically conductive annular ring, the magnets are disposed in a spaced apart relationship on a side of the annular ring, the annular ring has a smaller cross-sectional width in locations where the magnets are disposed, relative to a cross-sectional width in locations where magnets are not disposed, such that the magnets are recessed into the annular ring.

2. The assembly of claim 1, the plurality of magnets is oriented to generate a Halbach array.

3. The assembly of claim 1, the annular ring comprises a core of optimized non-oriented electrical steel.

4. The assembly of claim 1, the assembly is integral to a rotary motor.

5. The assembly of claim 1, the uniformly varied cross-sectional dimension comprises peaks and valleys that are generally sinusoidal in shape and that conform to the magnetic flux distribution.

6. The assembly of claim 1, the uniformly varied cross-sectional dimension comprises peaks and valleys that are square in shape for ease of manufacturing.

7. The assembly of claim 1, the uniformly varied cross-sectional dimension comprises peaks and valleys that are triangular in shape for ease of manufacturing.

8. A magnet assembly for a motor comprising:
   a magnetically conductive metal backing with a varied cross-sectional thickness that forms a series of peaks and valleys; and
   a plurality of magnets associated with the magnetically conductive metal backing wherein the valleys occur in regions aligned with centers of individual magnets in the plurality of magnets.

9. The magnet assembly of claim 8, the metal backing is an iron plate in a platen-and-forcer motor arrangement.

10. The magnet assembly of claim 8, the plurality of magnets is arranged to generate a Halbach array.

11. The magnet assembly of claim 10, employed in a platen-and-forcer device in a semiconductor fabrication system.

12. The magnet assembly of claim 11, the Halbach array cancels a magnetic field in a region above the platen and forcer.

13. The magnet assembly of claim 8, the peaks and valleys are generally sinusoidal in shape and conform to the magnetic flux distribution.

14. The magnet assembly of claim 8, the peaks and valleys are square in shape for ease of manufacturing.

15. The magnet assembly of claim 8, the peaks and valleys are triangular in shape for ease of manufacturing.

16. The magnet assembly of claim 8, further comprising notches in the metal backing that retain the magnets in position.

17. The magnet assembly of claim 8, wherein the metal comprises no notches in order to minimize weight of the magnet assembly.

* * * * *